(12) United States Patent
Andre et al.

(10) Patent No.: US 7,645,060 B2
(45) Date of Patent: Jan. 12, 2010

(54) SUPPORT FOR A MOTOR VEHICLE LIGHT UNIT, A LIGHT UNIT, AND AN ASSEMBLY COMPRISING A FRONT END MODULE AND SUCH A SUPPORT AND/OR LIGHT UNIT

(75) Inventors: Gérald Andre, Amberieu en Bugey (FR); Laurent Decker, Villeurbanne (FR); Hugues Cheron, Meximieux (FR); Naoufil Ben Mariem, Decines Charpieu (FR)

(73) Assignee: Compagnie Plastic Omnium, Lyons (FR)

( * ) Notice: Subject to any disclaimer, the term of this patent is extended or adjusted under 35 U.S.C. 154(b) by 88 days.

(21) Appl. No.: 11/013,305

(22) Filed: Dec. 15, 2004

(65) Prior Publication Data
US 2005/0207175 A1 Sep. 22, 2005

(30) Foreign Application Priority Data
Dec. 15, 2003 (EP) .................................. 03293153

(51) Int. Cl.
*B60Q 1/04* (2006.01)
(52) U.S. Cl. ........................ 362/505; 362/506; 362/507; 362/524; 362/529

(58) Field of Classification Search ................. 362/493, 362/495, 496, 497, 501, 503, 505, 506, 507, 362/523, 548, 549, 368, 285, 418, 460, 524, 362/529
See application file for complete search history.

(56) References Cited

U.S. PATENT DOCUMENTS

| 6,017,137 A * | 1/2000 | Suehiro et al. ............... 362/289 |
| 6,199,817 B1 | 3/2001 | Schmickl |
| 6,290,379 B1 * | 9/2001 | Iwasaki et al. ............... 362/512 |
| 6,637,919 B2 * | 10/2003 | Shirai .......................... 362/515 |
| 7,052,164 B2 * | 5/2006 | Burton ........................ 362/507 |
| 2005/0040672 A1 * | 2/2005 | Andre ..................... 296/187.09 |

FOREIGN PATENT DOCUMENTS

| DE | 40 21 255 A | 1/1991 |
| DE | 196 32 688 A | 2/1997 |
| EP | 1 048 554 B1 | 2/2000 |
| EP | 1 194 327 B1 | 6/2000 |
| EP | 1 398 209 A | 3/2004 |

* cited by examiner

*Primary Examiner*—Thomas M Sember
(74) *Attorney, Agent, or Firm*—James R. Williams

(57) ABSTRACT

The present invention relates to a support for a motor vehicle light unit that enables the light unit to be mounted displaceably on an equipment module. The support includes a guide for guiding the light unit along a predetermined path relative to the equipment module.

17 Claims, 4 Drawing Sheets

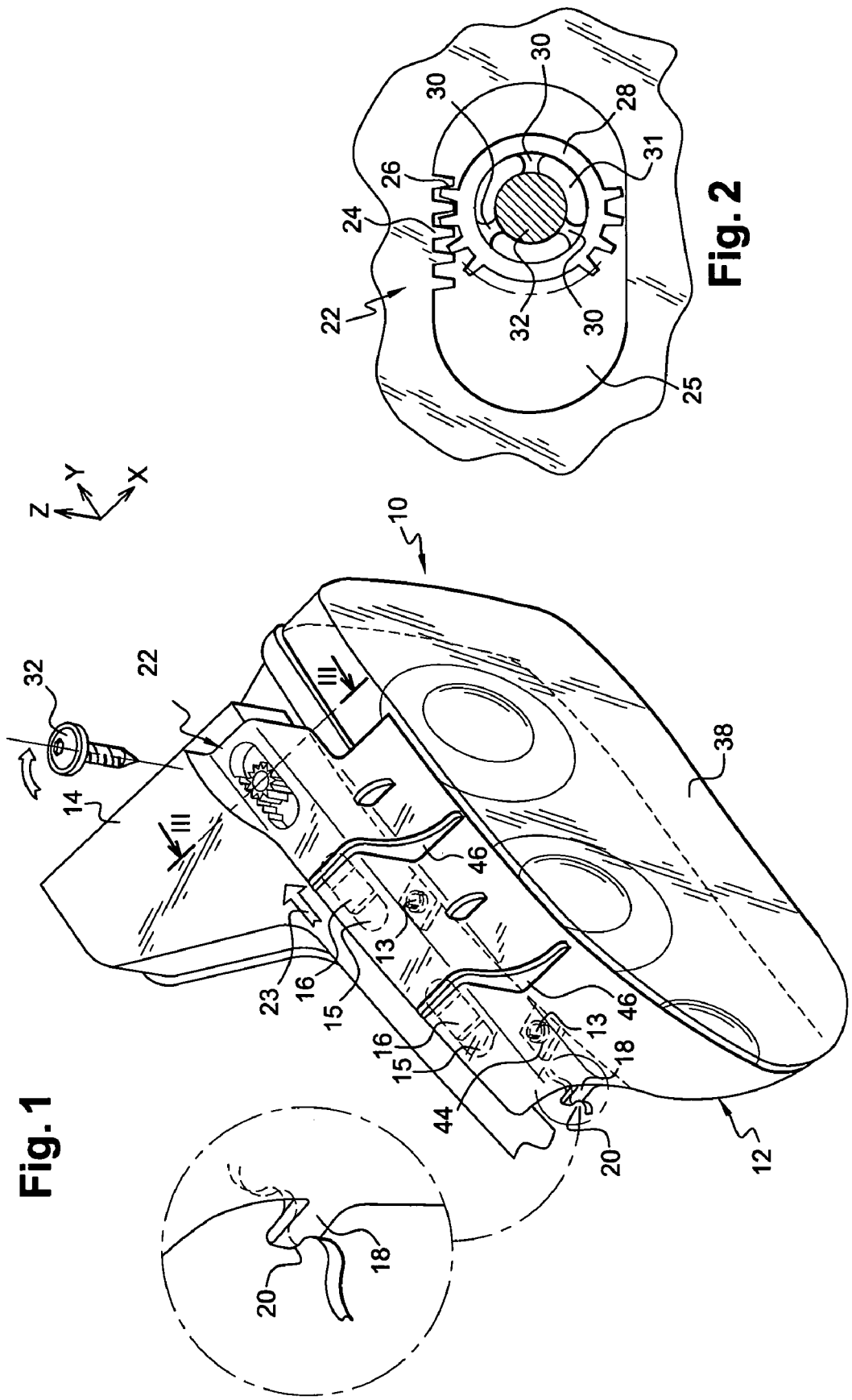

SUPPORT FOR A MOTOR VEHICLE LIGHT UNIT, A LIGHT UNIT, AND AN ASSEMBLY COMPRISING A FRONT END MODULE AND SUCH A SUPPORT AND/OR LIGHT UNIT

The present invention relates to means for fastening a light unit to a motor vehicle.

As a general rule, motor vehicle light units need to be mounted on the vehicle in a manner that is very accurate relative to the fenders or other bodywork parts of the vehicle, in order to satisfy ever more precise criteria relating to appearance.

In general, a light unit for a front face module is mounted on a vehicle in three stages.

In the first stage, the light unit is fastened in a theoretical position on the front end module of the vehicle.

In the second stage, the front end module is mounted on and fastened to the front unit of the motor vehicle, which unit includes, in particular, bodywork parts such as the front fenders.

The third stage consists in putting the light unit accurately into position relative to the bodywork parts of the front unit. Indeed, such front units present relatively large amounts of dimensional dispersion between vehicles, so that the theoretical positioning of the headlights is not sufficient. The manufacturer is thus obliged to have each vehicle adjusted by hand. To do this, an operator repositions the light unit relative to the other bodywork parts, moving it manually and pushing it against spacers.

The problem lies in the fact that this displacement and setting of the light unit are entirely manual, and therefore expensive in terms of labor costs and execution time.

The present invention seeks to remedy that drawback by proposing a light unit support that enables the light unit to be put accurately into position during the steps of assembling or fastening the front end module on the front unit of the vehicle, i.e. during the second stage of mounting the light unit.

For this purpose, the invention provides a support for a motor vehicle light unit, the support enabling said light unit to be mounted displaceably on an equipment module, and being characterized in that it includes guide means for guiding the light unit along a predetermined path relative to the equipment module.

Thus, by means of the invention, the light unit is guided, e.g. by means of a slideway, so as to move along a predetermined path towards its reference position during the stage of mounting or fastening the front end module on the front unit of the vehicle, thereby avoiding the third stage of manual adjustment.

In an embodiment of the invention, the light unit support includes a mechanism for exerting a displacement force on the light unit.

Thus, during mounting, the displacement mechanism assists the operator in displacing the light unit easily and effectively, so as to put it into its reference position on the front unit. This positioning can thus be performed quickly, and therefore inexpensively.

Such a mechanism can bear against the equipment module or against a bodywork part of the vehicle.

Optionally, such a mechanism comprises a pinion for driving a rack.

Using such a rack-and-pinion system, the mechanism transforms rotary movement performed by the operator into movement whereby the support is displaced along a path that is optionally curvilinear.

Optionally, the pinion includes a hole suitable for receiving a screw, and abutments that are positioned and rated firstly so that they bend during insertion of the screw into the hole and prevent the screw from turning, so that turning the screw when blocked in this way causes the pinion to turn, and subsequently so that they give way when the screw exerts torque greater than a predetermined threshold, such that the screw screws into a nut disposed behind the support.

Thus, once the light unit comes into abutment against the fender, the screw exerts torque greater than the threshold, thereby causing the abutments to give way so as to fasten the support, and thus the light unit, that has come into abutment against the fender in definitive manner so that the light unit is fastened in its reference position.

Furthermore, such a light unit support may have stiffening ribs. Thus, in addition to its function of displacing the light unit, the support is sufficiently rigid to carry the light unit while it is being adjusted or prior to its final mounting on the front unit.

A light unit support of the invention may also include one or more of the following characteristics:
- the light unit is guided generally in the transverse direction of the vehicle; the guide means is arranged so that when the support is mounted on the equipment module, mounting or fastening the equipment module on the motor vehicle causes the light unit to be displaced towards a bodywork part;
- the support includes indexing for temporarily holding the light unit to the equipment module before it is displaced;
- the support includes permanent fasteners for the light unit;
- the guide means is a slot of oblong shape;
- the displacement mechanism includes a recentering shape;
- the support enables said light unit to be mounted so as to be displaceable relative to a motor vehicle fender;
- the support enables said light unit to be mounted so as to be displaceable relative to a motor vehicle bumper; and
- the support includes means for pressing a motor vehicle bumper against the support.

The invention also provides a motor vehicle light unit including a portion constituting a support of the above-specified type.

The invention also provides an assembly comprising an equipment module and a light unit support for a light unit of the above-specified type.

Optionally, the equipment module of such an assembly is a front end module. Thus, the support can be fastened equally well to the cross-member or to a portion of the front end module fastened in register with a side rail, depending on the sizes of those parts.

Optionally, in such an assembly, the support guide means co-operate with guide means arranged on the equipment module.

Finally, the invention provides an assembly of the above-described type together with a structural part of the vehicle, in which the support has fastener means for engaging the structural part.

The invention will be better understood on reading the following description given purely by way of example and made with reference to the drawings, in which:

FIG. 1 is a perspective view of a light unit support of the invention mounted on a motor vehicle cross-member;

FIG. 2 is a plan view of the mechanism for displacing the FIG. 1 light unit;

In the present description, only one side of the vehicle is taken into consideration, but the person skilled in the art can easily apply the teaching given to both light units of the vehicle.

The direction X corresponds to the travel direction of the vehicle, the direction Y corresponds to the transverse direction of the vehicle, and the direction Z corresponds to the vertical direction.

FIG. 1 shows a light unit 10 for mounting on the left front corner of a motor vehicle. The light unit is carried by a support 12 fastened to a cross-member 14 of the front end module of the vehicle. The support 12 is fastened to the light unit by fasteners 13 that are strong and permanent.

Figure 5:
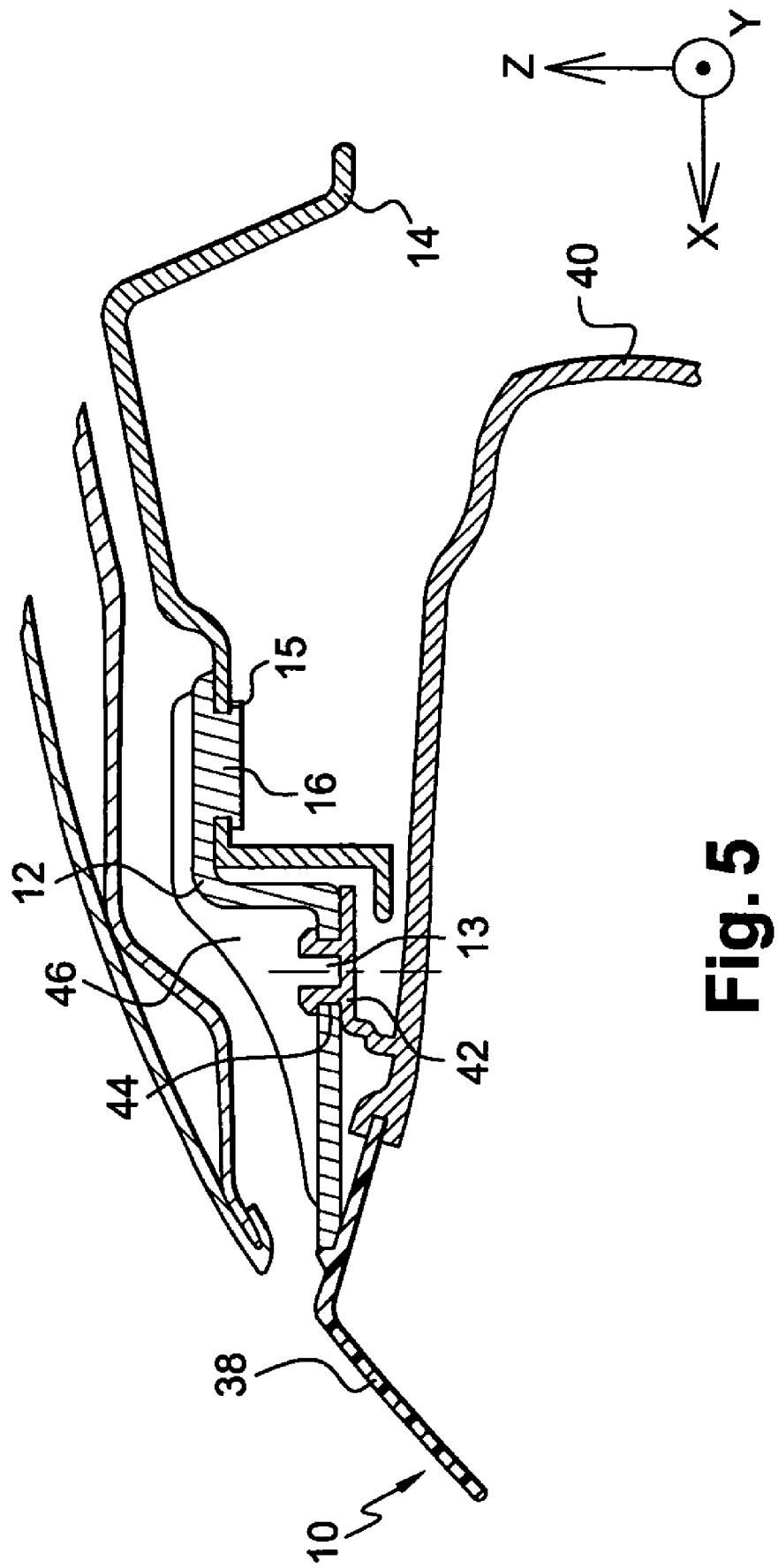
FIG. 5 is a section perpendicular to the direction Y through the top portion of the FIG. 1 light unit, once it has been put into its reference position on the vehicle.

In FIG. 5 it can be seen how the light unit 10 is fastened on the support 12. The light unit 10 comprises a glass 38 and a box 40. The box 40 has a fastening tab 42 projecting from its top wall. The fastening tab 42 includes clips 13 integrally molded therewith for inserting into orifices 44 arranged in the support 12.

Since the support 12 may be required to support the light unit 10 during adjustment stages, it is preferably placed vertically above the center of gravity of the unit 10, so as to perform this function optimally.

Furthermore, the support 12 has stiffening ribs 46 for consolidating it. The support must be strong enough to carry the light unit while the light unit is not yet supported by the bottom members of the vehicle, i.e., for example, during transport from a factory for assembling the front end module and a factory for assembling the front end module on the front unit of the vehicle.

In FIG. 1, the light unit 10 is being put into its reference position relative to a front left fender (not shown). The reference position corresponds to the light unit being positioned so that firstly the clearance in the Y direction between the glass 38 of the light unit and the fender is predetermined, and secondly the glass 38 of the light unit comes flush with the fender in the X direction.

The light unit together with its support 12 is mounted on the vehicle in the embodiment described in three stages.

The first stage consists in mounting the light unit 10 and its support 12 on the front end module, away from the vehicle. Since it is not possible to put the light unit into its reference position without the fenders, this first mounting stage does not involve putting the light unit into its reference position, but merely holding it temporarily, optionally using frangible means (i.e. means that are suitable for being broken) in order to allow it to be put into its reference position.

Figure 3:
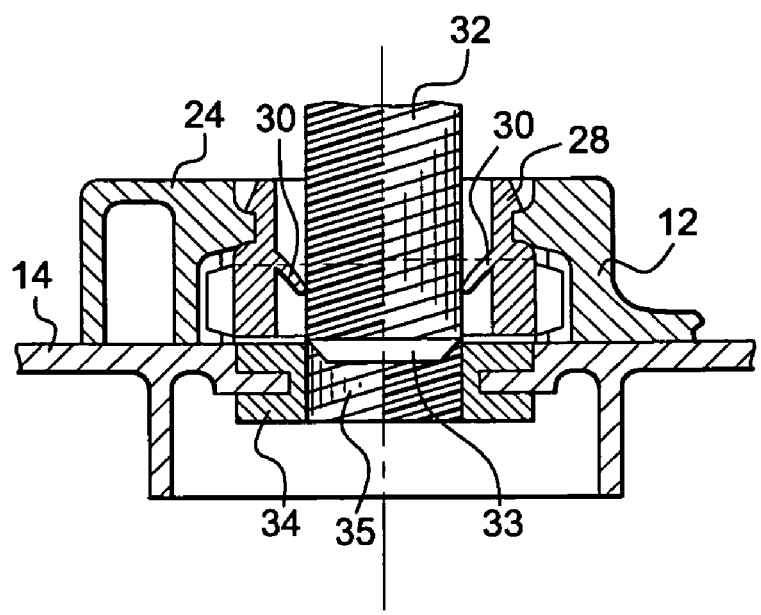
FIG. 3 is a section on III-III of FIG. 1 through the light unit support fastened on the vehicle cross-member.

This first assembly stage consists in securing the light unit 10 to the cross-member 14, which cross-member includes two slots 15 for this purpose that are oblong in the Y direction. Two studs 16 (visible in FIG. 5) integrally molded with the support 12 co-operate with the slots 15 so as to enable the studs to slide along the Y direction. Thus, when the studs 16 are inserted into the slots 15 in the cross-member 14, the support 12, and thus the light unit 10, is prevented from moving relative to the X and Z directions, while being free to slide in the Y direction. In order to allow various handling operations to be performed during mounting, the light unit 10 is positioned temporarily in the Y direction along the cross-member 14 by means of a lug 18 arranged at the back of the support 12 for engaging in a notch 20 in the cross-member. This temporary position of the support relative to the cross-member 14 corresponds to a position in which an oblong slot 25 arranged in the thickness of the top portion of the support 12 is situated in register with an orifice 35 arranged in the cross-member 14, as can be seen in FIG. 3.

The second stage consists in mounting the front end module fitted with the temporarily-positioned light unit on the front unit of the vehicle, with the fender already being in place on the vehicle.

Once the front end module has been mounted on the vehicle, the third stage consists in putting the light unit 10 into its reference position relative to the fender. To do this, the light unit is moved towards the fender. The direction in which the light unit is displaced is the transverse Y direction of the vehicle. In another embodiment that is not shown, the displacement direction depends on the direction of clearance defined between the light unit and the bodywork part.

A displacement mechanism 22 serves for this purpose to put the support 12, and thus the light unit 10, into movement so as to bring it closer to the fender in the direction of arrow 23 (FIG. 1).

The mechanism 22 which is shown in detail in FIG. 2 comprises a rack 24 with teeth 26 arranged on one side of the slot 25 of the support 12.

This rack 24 is driven by a pinion 28 having peripheral teeth 29 for meshing with the teeth 26 of the rack 24.

The pinion 28 has a central hole 31 for receiving a screw 32, and three abutments 30 project into the hole, the abutments being in the form of concentric tongues of flexible plastics material.

When an operator inserts the screw 32 into the hole 31 of the pinion 38, the screw penetrates into the hole 31, causing the abutments 30 to bend to allow the screw to pass, until the end 33 of the screw comes into abutment in a nut 34 held captive in the cross-member 14, the end 33 penetrating part of the way, into the hole in the nut 34.

When the operator begins to turn the screw 32, the screw is prevented from rotating in the hole 31 by the abutments 30 which press against the thread of the screw 32. Since the abutments 30 present greater resistance than the rolling resistance of the pinion 28 against the rack 24, turning the screw 32, while it is prevented from turning by the abutments, serves to turn the pinion 28 about the axis of rotation constituted by the screw 32. Since part of the screw 32 is inserted in the nut 34, this axis of rotation is prevented from moving relative to the cross-member 14.

The abutments 30 are strong enough to ensure that when the pinion 28 begins to turn, the lug 18 of the support 12 bends and breaks in the notch 20 so as to release the support 12 from its temporary holding position. Thereafter, the support 12, and thus the light unit 10, can slide in the Y direction because of the guide means constituted by the studs 16 sliding in the slots 15.

Thus, turning the pinion 28 serves to drive the rack 24, and thus the support 12, so as to displace the light unit in the direction of arrow 23 towards the fender.

On coming into abutment against the fender, or against spacers (not shown), the light unit 10 is in its reference position, and can therefore be secured definitively to the cross-member 14.

Since the light unit 10 is in abutment, the pinion 28 can no longer turn. Consequently, when the operator continues to turn the screw 32, greater force is exerted which causes the abutments 30 to bend. Once the abutments 30 have bent, they no longer oppose any resistance to the screw, so the screw becomes screwed down in the nut 34 in conventional manner so as to secure the support 12 definitively to the cross-member 14.

Mounting of the light unit 10 on the vehicle is then complete.

In other embodiments (not shown), the abutments 30 do not fold, but instead they break or are passed through by force.

FIG. 3 shows that the screw 32 secures the support 12 to the cross-member 14 by means of a screw 34 held captive in the orifice 35 in the cross-member 14.

Figure 4:
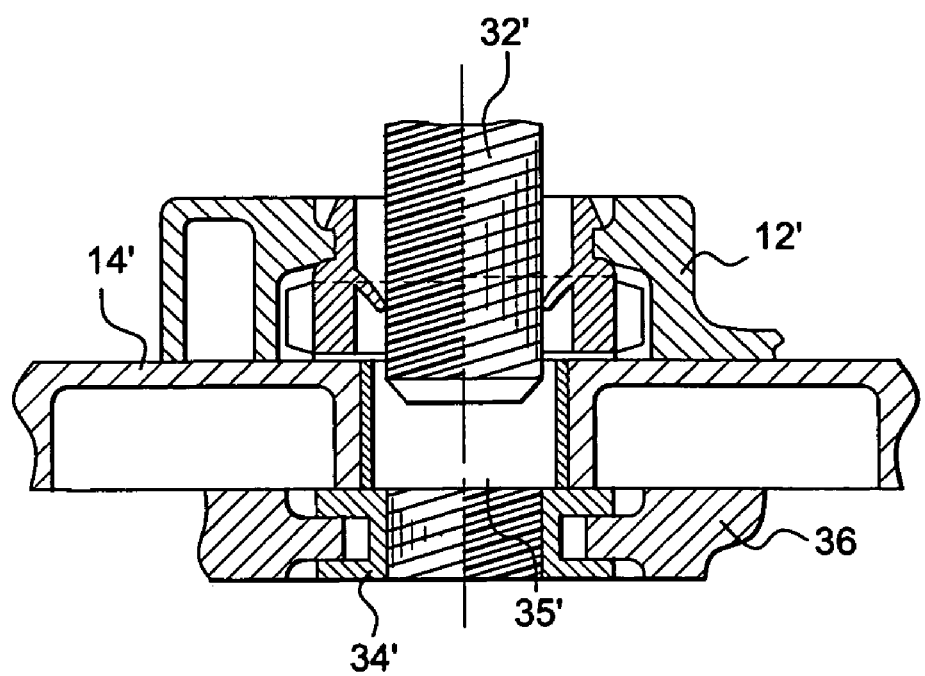
FIG. 4 is a section view analogous to FIG. 3 of a light unit support in another embodiment of the invention, fastened on the cross-member and on the structure of the vehicle.

In another embodiment, shown in FIG. 4, the screw 32' passes through an orifice 35' arranged in the cross-member 14' and also serves to fasten the support 12' on a structural part 36 of the vehicle. In this case, a nut 34' mounted loosely in the structural part 36 enables the screw 32' to be secured both to the support 12' and to the cross-member 14'. This embodiment enables the fastening of the support 12' to be consolidated and takes advantage of this fastening of the support to the cross-member 14' for fastening the cross-member 14' to the structural part 36.

Amongst the advantages of this embodiment of the invention, it should be observed that the operator mounting the light unit no longer needs to monitor the clearance between the light unit and the fender, followed possibly by repositioning the light unit, but needs only to position the light unit definitively in abutment against the fender by turning the screw 32, without undertaking the random operation of monitoring the clearance. During the positioning stage, the operator is also assisted by the mechanism 22, which enables the operator to displace the light unit solely by turning the screw 32 on the front end module.

Another advantage of the support 12 with the mechanism 22 consists in that it simplifies the work carried out on an assembly line, but without adding any additional equipment thereto.

In an embodiment of the invention that is not shown, a pinion similar to the pinion 28 can be secured to the light unit support while a rack is secured to the front end module. Under such circumstances, the pinion and the rack co-operate in the same manner as described above so as to displace the support towards the fender when a screw is turned in the pinion.

Furthermore, in another embodiment that is not shown, the light unit is indexed during the first mounting stage, not by inserting the lug 18 in the groove 20, but by temporarily preventing the pinion 28 from moving, so as to prevent the support 12 from moving. This can be done, for example, by means of an abutment projecting from the support 12, arranged in the slot 25, and interposed between two teeth of the pinion 28 so as to prevent it from turning. When the light unit begins to be put into position, the operator breaks this abutment on beginning to turn the screw in the pinion, thereby enabling the pinion to turn and position the light unit as described above.

Figure 6:
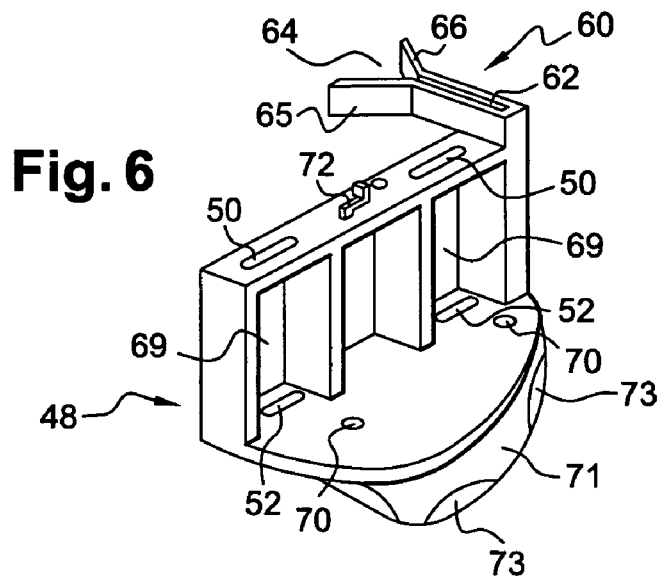
FIG. 6 is a diagrammatic perspective view of a light unit support in another embodiment of the invention.

In the embodiment of FIG. 6, a light unit support 48 of the invention has temporary holding means that are constituted by guide means 50, 52. These means enable the support 48 to be prevented from moving relative to the X and Z directions, while leaving it to move in the Y direction. In the figure, the means 50, 52 are oblong holes. In another embodiment, they could be slideways.

Figure 8:
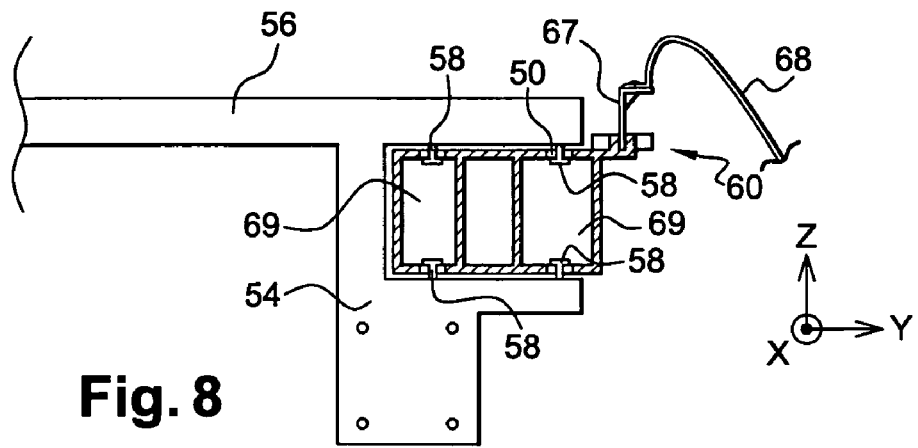
FIG. 8 is a section view on VIII-VIII of FIG. 7.

Two of these means 52 are situated on the bottom portion of the support 48 to secure the support to a portion 54 of the front end module that is arranged in register with the top portion of a side rail of the vehicle, as can be seen in FIG. 8. The other two means 50 are situated on the top portion of the support 48 for fastening it in register with the cross-member 56 of the front end module.

As can be seen in FIG. 8, the means 50, 52 enable fastening to be achieved to the front end module 54, 56 in the X and Z directions while allowing displacement in the Y direction by using studs 58 that are secured to the front end module 54, 56.

As can be seen in FIG. 6, the top portion of the support 48 has an arm 60 constituting a displacement mechanism of the invention, the arm having a slot 62 extending in the X direction and in turn extended by a recentering shape 64, itself constituted by two diverging walls 65 and 66 forming a V-shape and arranged to receive a fender support 67, i.e. a part that is rigid, known per se, and secured to an inside rim of the fender 68.

The support 48 is also perforated by openings 69 so as to require little material and make it lighter in weight.

Figure 7:
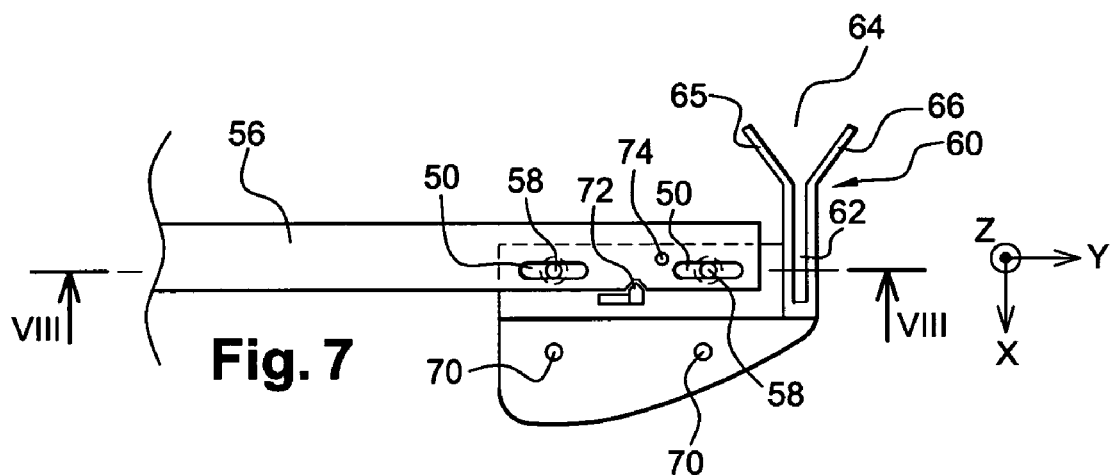
FIG. 7 is a plan view of the FIG. 6 support when mounted on a front end module.

In FIGS. 6, 7, and 8, the light unit is omitted in order to simplify the figures.

The light unit is mounted on the vehicle by performing the following stages.

The light unit is initially preassembled with the support 48 by conventional permanent fastener means 70. Then, in a first stage, the assembly comprising the support 48 and the light unit is mounted on the front end module with temporary positioning in the transverse or Y direction. During this first stage, the studs 58 are inserted in the guide means 50, 52 situated on the support 48 so as to ensure that the support 48 is prevented from moving relative to the front end module in the X and Z directions, while being free to slide in the Y direction. Optionally, the support 48 may temporarily be held in the Y direction by means of a flexible indexing finger 72.

The second and last stage consists in mounting the front end module on the front unit having the fender already in place.

While this mounting operation is taking place, the front end module is moved onto the front unit along the X direction. One of the two walls 65, 66 constituting the recentering shape 64 of the guide means 60 encounters the fender support 67 and slides against said support, thereby guiding the support 48 in the Y direction until the fender support 67 has penetrated fully into the slot 62 of the arm 60, so that the support 48 is positioned relative to the fender 68.

This position corresponds to the light unit being in its reference position relative to the fender 68. It can then be fastened definitively by conventional means, e.g. a permanent fastening screw 74.

Optionally, such locking can serve simultaneously to fasten the front end module relative to a structural part of the front unit.

Furthermore, in FIG. 6 it can be seen that the support 48 includes an area 71 under its bottom portion that acts as means for pressing the vehicle bumper skin against the support 48. The area 71 has tongues 73 for retaining a rim (not shown) of the bumper skin.

Thus, the support of the invention serves to mount the light unit by moving it in the Y direction of the vehicle, thereby restricting design options less than would be the case if the light unit could be moved only in the assembly or X direction.

In an embodiment that is not shown, a support of the invention can be used for a rear light unit of a motor vehicle so as to put the light unit into a reference position relative to a rear fender or to an upright of an opening in the vehicle. Under such circumstances, the equipment module is a rear support module.

In another embodiment (not shown), the light unit support enables it to be displaced in the Z direction so as to put it into a reference position relative to the vehicle bumper. This support can also enable displacement to take place in the Y direction, as described above.

Finally, it should be observed that the invention is not restricted to the embodiments described above.

The invention claimed is:

1. An assembly for a motor vehicle comprising a light unit, the light unit comprising:
   a) a glass and a box,
   b) a support,
   c) a front end carrier, and
   d) stiffening ribs on the support,
   the support displaceably mounting the light unit on the front end carrier, the support comprising a guide for guiding the light unit along a predetermined path relative to the front end carrier, the guide being arranged so that, after the support is mounted on the front end carrier, mounting the front end carrier on the motor vehicle causes the light unit to be displaced towards a bodywork part along the predetermined path relative to the front end carrier.

2. The assembly of claim 1, wherein the support includes a mechanism for exerting a displacement force on the light unit.

3. The assembly of claim 2, wherein the mechanism bears against the front end carrier.

4. The assembly of claim 2, wherein the mechanism bears against a bodywork part of the vehicle.

5. The assembly of claim 1, wherein the predetermined path is a transverse direction of the vehicle.

6. The assembly of claim 2, wherein the mechanism includes a pinion for driving a rack.

7. The assembly of claim 6, wherein the pinion defines a central hole for receiving a screw, abutments positioned and rated firstly to bend when the screw is inserted into the hole and prevent the screw from rotating so that the screw when blocked in this way causes the pinion to turn, and subsequently to give way when the screw exerts torque greater than a predetermined threshold, such that the screw then screws into a nut arranged behind the support.

8. The assembly of claim 1, wherein the light unit includes indexing for temporarily holding the light unit in position on the front end carrier before displacement thereof.

9. The assembly of claim 1, wherein the light unit includes permanent fasteners engaging the light unit.

10. The assembly of claim 1, wherein the guide defines a slot of oblong shape.

11. The assembly of claim 2, wherein the displacement mechanism comprises a recentering shape.

12. The assembly of claim 1, wherein the light unit is capable of being mounted displaceably relative to a motor vehicle fender.

13. The assembly of claim 1, wherein the light unit is capable of being mounted displaceably relative to a motor vehicle bumper.

14. The assembly of claim 1, wherein the guide of the support cooperates with a second guide on the front end carrier.

15. The assembly of claim 1, wherein the support includes fastener means for engaging a structural part.

16. An assembly for a motor vehicle comprising a light unit, the light unit comprising:
   a) a glass and a box,
   b) a support,
   c) a front end carrier, and
   d) pressing means for pressing a motor vehicle bumper against the support, the support displaceably mounting the light unit on the front end carrier, the support comprising a guide for guiding the light unit along a predetermined path relative to the front end carrier, the guide being arranged so that, after the support is mounted on the front end carrier, mounting the front end carrier on the motor vehicle causes the light unit to be displaced towards a bodywork part along the predetermined path relative to the front end carrier.

17. A motor vehicle comprising a bodywork part and an assembly, the assembly comprising a light unit, the light unit comprising a glass and a box, a support, a front end carrier, and stiffening ribs on the support, the support displaceably mounting the light unit on the front end carrier, the support comprising a guide for guiding the light unit along a predetermined path relative to the front end carrier, the guide being arranged so that, after the support is mounted on the front end carrier, mounting the front end carrier on the motor vehicle causes the light unit to be displaced towards a bodywork part along the predetermined path relative to the front end carrier.

* * * * *